April 5, 1960  G. H. McLAUGHLIN ET AL  2,931,974
METHOD OF GEOPHYSICAL PROSPECTING
Filed June 30, 1954  2 Sheets-Sheet 1

INVENTORS
GEORGE H. McLAUGHLIN
HERBERT A. HARVEY
WILLIAM O. CARTIER
WILLIAM A. ROBINSON
by Douglas S. Johnson
atty.

April 5, 1960  G. H. McLAUGHLIN ET AL  2,931,974
METHOD OF GEOPHYSICAL PROSPECTING
Filed June 30, 1954  2 Sheets-Sheet 2
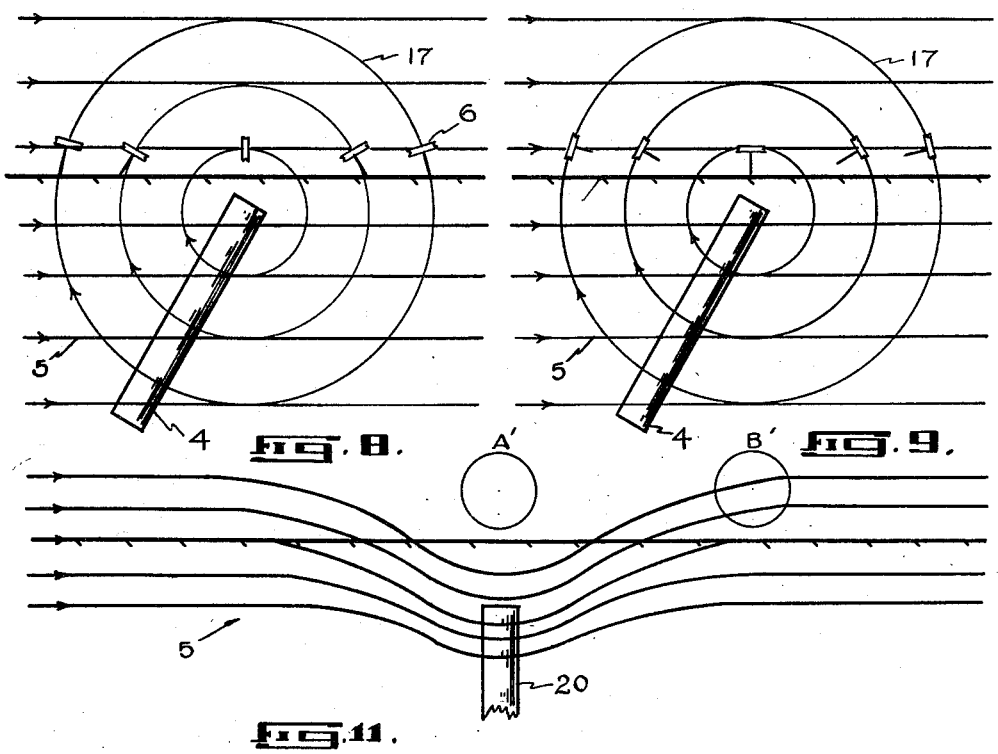
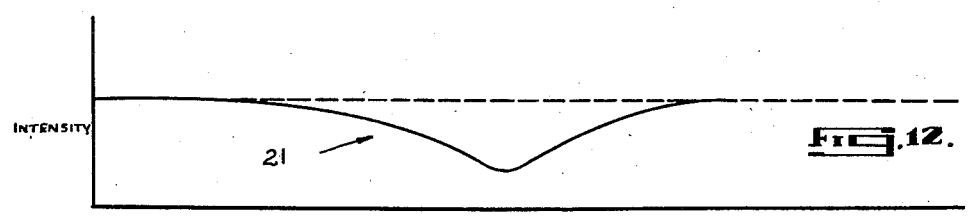
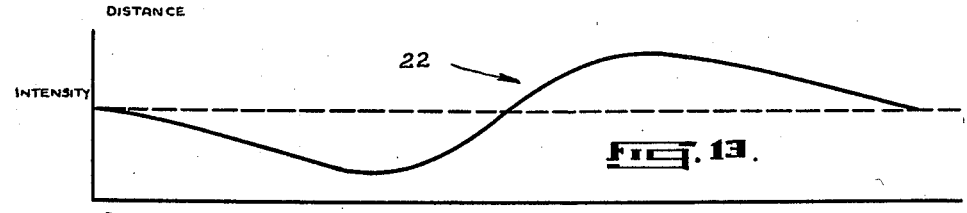
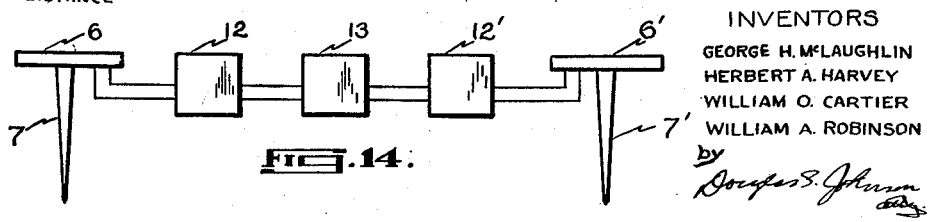
INVENTORS
GEORGE H. McLAUGHLIN
HERBERT A. HARVEY
WILLIAM O. CARTIER
WILLIAM A. ROBINSON
by
Douglas S. Johnson

# United States Patent Office 2,931,974
Patented Apr. 5, 1960

2,931,974
METHOD OF GEOPHYSICAL PROSPECTING

George H. McLaughlin, Herbert A. Harvey, William O. Cartier, and William A. Robinson, Toronto, Ontario, Canada, assignors, by mesne assignments, to Crossland Licensing Corporation Limited, Toronto, Ontario, Canada Application June 30, 1954, Serial No. 440,406

29 Claims. (Cl. 324—8)

This invention relates to improvements in geophysical prospecting.

There are presently in use two different methods of geophysical prospecting in which the presence of subterranean bodies having magnetic or electrical conductor properties can be detected by equipment which does not require a physical contact with the surface of the earth.

In the case of locating a body of magnetic material a magnetometer, which measures the steady state amplitude of the earth's magnetic field, is employed.

Variations in the amplitude in this field throughout the area to be investigated are analyzed to determine the presence of magnetic materials or to deduce the variation of structure of the magnetic formation. Indications of the presence of magnetic materials can be the means of finding magnetic minerals such as pyrrhotite, magnetite, etc. Structural variations can be detected by the changes in the magnetic field pattern are also sometimes indicative of the presence of other types of minerals, and also, petroleum.

When it is desired to detect a buried conductor body by equipment which can be removed along the surface, an electro-magnetic transmitter is employed to create a local alternating magnetic field in the area to be investigated. Either or both direction or amplitude of the field can be measured throughout the area.

Changes in the pattern are analysed to determine the presence of a conductor or to deduce variations in electrically conducting formations. This method is used to find minerals such as metallic sulphides, copper, nickel, iron and silver.

An obstacle to magnetometer measurements is created by the permanent magnetization of magnetic material. This will be understood when it is appreciated that the magnetic material has had induced therein a permanent magnetization due to the influence of the earth's magnetic field creating an orientation of the crystalline structure of the material when it was first cooled from liquid form or first deposited in a particular orientation. This permanent magnetization occurs under the influence of the earth's magnetic field in the same manner that the ordinary horseshoe magnet is magnetized by placing it in the vicinity of a strong permanent magnet.

This distinction between the normal earth's field and the existence of local magnetic fields due to an induced magnetism is well understood by those skilled in the art.

The magnetometer measures the total magnetic field existing at the particular measuring location which consists of both the earth's normal field and the local field from the permanent magnetizing of the material in the earth at that location.

Where this material has been shifted, due to some natural phenomena such as an earthquake, etc., it can act to either augment or diminish the normal earth's field at that location.

Consequently, the ordinary magnetic anomaly which is detected by a magnetometer cannot distinguish between increases of magnetic material and the effect of any permanently magnetised material which has been shifted. Therefore, such magnetometer measurements must inherently have an uncertain qualitative and especially uncertain quantitative value.

Moreover, of course, the magnetic or magnetometer method only determines the presence of a magnetic body and the commercially valuable conductor bodies are ignored.

With respect to the electro-magnetic prospecting methods, these methods are complicated by requiring a cumbersome and heavy local transmitter. Further, to give more comprehensive results a series of measurements at more than one frequency is desirable and this requires several different transmitters.

Moreover, the distance between the transmitter and point of measurement of the field by a suitable detector will affect the results obtained.

As large distances between the transmitter and detector are necessary to detect effects of deep conductors, these large spreads necessarily require even heavier transmitting equipment, increasing the problems encountered with the method.

Each of the magnetometer and electro-magnetic methods are substantially mutually exclusive. The magnetometer will not detect anomalies which are even highly conductive which are not also magnetic anomalies, and the electro-magnetic method will not detect magnetic anomalies which are not themselves or not associated with electrical conductor bodies unless the magnetic material is concentrated to an exceptionally high degree.

There are, of course, other prospecting methods such as the electrical resistivity methods in which electrodes are driven or introduced into the earth's surface to carry out the measurements. These methods are, however, fixed station methods and impractical for carrying out a survey over a large area.

It is the object of the present invention to provide a reliable geophysical prospecting method which will locate subterranean conductors with a high degree of accuracy, yet which can be carried out with equal facility to present magnetometer methods for locating magnetic materials, without requiring any local transmitter.

Another important object is to provide a prospecting method that will locate magnetic material as well as conductor materials and will be capable of readily distinguishing between such materials.

Again, it is an important object to provide a method as aforesaid capable of supplying much more quantitative information about subterranean structures of formations than present known geophysical methods.

Still, a further important object is to provide a method as aforesaid which will have a much greater range of detection for deeply buried conductors than present geophysical methods.

The present invention resides in the novel concept of detecting transients of the earth's magnetic field which we have found to be affected by the presence of both magnetic and conductor anomalies as a means of locating such magnetic or conductor anomalies as will hereinafter be more fully described.

With reference to the accompanying drawings, Figure 1 is a graph showing the variations of the earth's magnetic field with time.

Figure 8 is a diagrammatic illustration of another mode of measuring time transient magnetic fields in accordance with the invention to obtain maximum intensity and direction of the transient magnetic fields adjacent to conductor body.

Figure 9 is a view similar to Figure 8 but showing the measurement of the transient magnetic fields for direction in a horizontal plane as determined by position of detector for minimum signal.

Figure 11 is a diagrammatic illustration showing the concentration and distortion of the transient magnetic fields caused by a body having magnetic properties.

Figure 12 is a view similar to Figure 7 but showing the reversal of the intensity obtained when the method of Figure 8 is carried out in the vicinity of a magnetic body.

Figure 13 is a view similar to Figure 10 but showing the reversal of the dip angle curve obtained when the method of Figure 9 is carried out in the vicinity of a magnetic body.

Figure 14 is a diagrammatic illustration of a pair of detectors of a type shown in Figure 4 connected in opposition for measuring polarization of the transient magnetic fields, caused by an electrically conducting and/or magnetically permeable mineral deposit.

Figure 1:
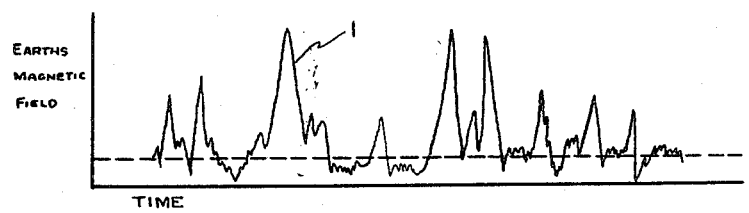

Magnetic observatories in various parts of the world have made daily records of the hourly changes in the earth's magnetic field. In general, these records show a fluctuation before and after the solar zenith for the point of observation. Often the pattern is reasonably uniform and is reproduced fairly regularly from day to day. Days on which the magnetic patterns show smooth fluctuation in this manner are described as "quiet" days. At other times the fluctuations are irregular and take place with much larger amplitudes. These are called "disturbed" days and have been found most frequent in years of high sun spot occurrence.

When equipment was developed for making continuous measurements smaller irregularities of a purely random nature were found superimposed on daily records. Irregularities of this type were found larger at times with sun spot occurrence and especially at the polar regions of the earth.

On quiet days the usual diurnal variations are of the order of plus and minus 10 gammas. On disturbed days the variations may be of the order of 100 gammas. The small random variations are found to be of the order of 1 gamma with durations of about 1 second. These variations, are commonly known in the art as time transients, meaning short term changes with time of the amplitude of a component of the earth's magnetic field.

We have found that more rapid fluctuations of the earth's magnetic field take place and have detected and measured these fluctuations by means of relatively large induction coils.

With this type of equipment the time constants of fluctuations, to be measured, could be selected by resonating the induction coils. These measurements have shown that the induced fields have measurable fluctuations taking place as rapidly as 20,000 cycles per second. Representative amplitudes obtained were $10^{-3}$ gammas at 100 cycles per second. The amplitudes of the fluctuations decrease with increase in measuring frequency. The fields are also normally random in direction over this frequency range, that is they do not have any particular azimuthal polarization, but are of substantially equal intensity in all directions on the surface of the earth. The same general amplitude is obtained for any azimuthal orientation of the receiving coil in space.

The possible sources of these time-varying magnetic fields are known in some cases and in other cases are still under investigation. The regular daily changes coincide with the earth's rotation and are of solar origin. The random variations are considered to come from sun spots and other types of solar variations, from lunar variations, and from atmospheric changes. Thunder storms produce effects which are sometimes concentrated in certain frequency bans. Man-made electrical noise, such as from power lines, has considerable effect near large cities.

Inasmuch as one of the most serious and long standing problems encountered in, and one of the major equipment limitations of, present electromagnetic prospecting methods is the creation of an alternating electro-magnetic or magnetic field so that the effects thereon of a conductor body can be detected, we conceived the idea of dispensing entirely with the necessity of creating such an alternating field and uutilizing the alternating or reversing part of the earth's magnetic field as a natural source alternating magnetic field source.

Following our concept we discovered that electrically conducting mineral deposits did in fact measurably affect the time transients of the earth's magnetic field.

We also found that bodies having magnetic properties also affected these time transients.

The effects produced by the electrically conducting and magnetically permeable mineral deposits were found to be a measurable alteration of the amplitude, direction, and phase of the random magnetic fields.

Inasmuch as the magnetic time transients vary with time it was originally not considered possible to derive any meaning from amplitude measurements of a field of such a fluctuating nature. However, we have discovered that the change in average amplitude of the field in the vicinity of a conductor or magnetic body can exceed the magnitude of the normal field fluctuations and so information of important significance from amplitude measurements is obtainable despite the fluctuation nature of the field with which the invention is concerned.

In a similar manner as far as we can determine the direction of the field impulses on the surface of the earth is purely random but in the vicinity of a conductor or magnetic body field impulses are constrained in definite directions by the action of the body.

For example when no conductor or magnetic material is present the same average signal is induced in a coil independently of its position in space. In the vicinity of a conductor or magnetic body there will be a position of the coil at which a minimum average signal will be induced.

In addition we discovered that the effects produced by electrically conducting bodies were distinctly different from those produced by bodies having magnetic properties.

Further we discovered that the source of the random magnetic fields or the time transients, whatever its origin, acts as a source located at an infinite distance from the conducting or magnetically permeable deposits yet producing measurable magnetic variations adjacent to the body, a condition highly desired but never achieved in conventional electro-magnetic prospecting where the necessarily short distances between the transmitter and receiver provided a serious limitation on the method.

Thus we have found that by employment of our concept of utilizing the earth's time transients, a new and vitally important method of geophysical prospecting arises in which the only equipment required to carry out detection of bodies having either electrically conducting or magnetic properties is a suitable detecting apparatus together with suitable indicating and/or recording apparatus.

Further we have found that the information which the measurable alterations caused by bodies having conducting or magnetic properties on the magnetic time transients provides a much greater and more accurate source of information about such bodies than previous prospecting methods.

Moreover and of vital importance is the fact that our new method provides for complete freedom as to the mode of detection of the measurable alterations of the magnetic time transients caused by the conducting or magnetically permeable mineral deposits and there is no need to have contact with the earth for measurement and there is no need to have any relative relation between a detector and a magnetic field generator maintained, as for instance in the case of present electro-magnetic methods. As a result, therefore, the present method lends itself particularly to being carried out from moving vehicles including land, water and aircraft. To facilitate a further understanding of the invention reference is to be had to the drawings. Referring first to Figure 1 the graph 1 of the earth's magnetic field plotted against time shows the random field variations with time and as far as can be told at present there appears to be no predominant frequencies although investigations are still being carried on. The field seems to consist of random pulses which have an effective frequency spectrum over the range of at least 1 cycle per second to 20,000 cycles per second with the average amplitude of the magnetic field transients decreasing with frequency.

Figure 2:
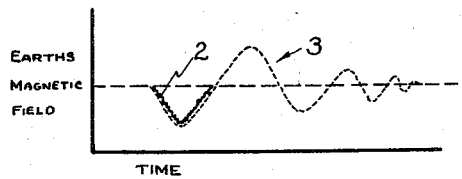
Figure 2 is a graph similar to Figure 1 but showing one isolated field reversal on a large scale then showing in dotted line the wave form set-up in a resonant circuit tuned to the frequency of the particular field reversal wave form shown.

In Figure 2 the magnified wave form 2 of a particular magnetic transient is illustrated.

Figure 5:
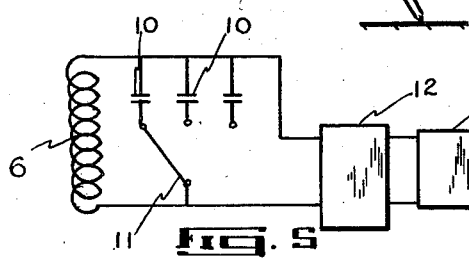
Figure 5 is part schematic and a part block diagram of the apparatus of the Figure 4.

Superimposed on the graph of Figure 2 is a dotted line showing 3 of the wave form which would be created in a resonant circuit such as shown in Figure 5 and hereinafter more fully described tuned to resonate to a frequency corresponding to the duration in time of the wave form 2, thus the particular transient 2 and other transients having a similar time factor can be detected by a resonant circuit due to the change in magnetic flux linking the circuit as is a well understood electro-magnetic principle.

Figure 3:
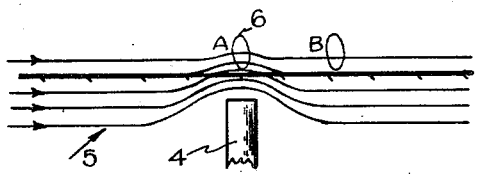
Figure 3 is a diagrammatic illustration showing the concentration and distortion of the earth's magnetic field time transients around the end of a conductor body.

We have found as illustrated in Figure 3 that in the neighbourhood of a conductor 4 the transient magnetic fields 5 perpendicular to the conductor are concentrated and directed around the edges of the conductor. These transient fields may, as before explained, be detected by a coil diagrammatically illustrated at 6 tuned to resonance to a frequency within the frequency spectrum of the transient fields. Because of the concentration of the fields at the conductor edges the coil 6 will measure a field of greater intensity at station A than it will at station B. In other words the amplitude of the single output from the coil will be larger at A than it will at B. From the determination of this effect it is possible to obtain information with respect to the conductor 4 by carrying out the method shown in Figure 6. In this case a coil 6 for instance mounted on a staff 7 and maintained at a particular angle is utilized to make measurements at a series of points D, E, F and G to measure the intensity of a component of the transient field over an area above a subterranean conductor 4. In the particular illustration the horizontal component of the transient field at a particular frequency selected is measured by having the coil 6 located with its plane vertical.

Figure 6:
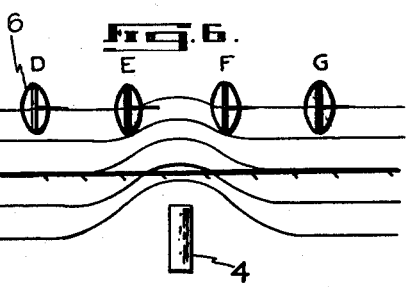
Figure 6 is a diagrammatic illustration of one mode of carrying out the invention by measuring the magnetic field time transients, by measuring the intensity thereof in a given direction at points adjacent to conductor body.
Figure 7:
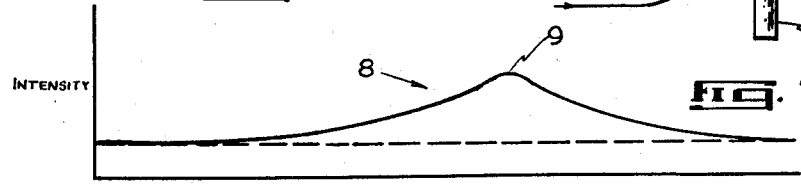
Figure 7 is a plot of the intensity on the transient magnetic field obtained from the method of Figure 8.

By plotting a curve 8 between the space-intensity relation of the magnetic field transients as illustrated in Figure 7 a peak 9 occurs over the conductor indicating the position of the conductor body. Because the conductivity of the conductor 4 determines the frequency of the transient magnetic field that will be concentrated further information can be obtained with respect to the conductor 6 in the method of Figure 6 if readings at one or more of the stations at different frequencies is taken. For instance, good conducting bodies such as massive sulphides will concentrate fields of all frequencies above a few cycles per second. Poor conductors such as disseminated sulphides will only concentrate fields above a few hundred cycles per second. Wet faults, clay, etc. will only affect high frequency fields. To enable different resonant frequencies for the circuit containing the coil 6 to be selected a plurality of condensors 10 as shown in Figure 5 are selectively connectable into the circuit including the coil 6 by means of a selector switch 11. The output signal from the resonant circuit comprising the coil 6 and the selected condenser 10 is fed through an amplifier 12 and the amplified signal indicated for instance by means of a meter 13. The amplifier 12 and the indicator may be of any suitable design or type to be of light and compact construction for easy transportation as it will be understood by those skilled in the art.

Figure 15:
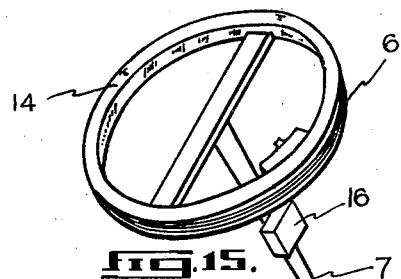
Figure 15 is a perspective view of a suitable detector with which the invention may be carried out.

The coil 6 may be of any suitable construction and a particular coil found to be satisfactory is shown as generally diagrammatic in Figure 4 and again in Figure 15. The coil comprises approximately 4,000 turns of wire wound on a generally circular form 14 of a diameter of approximately 3 feet and mounted on a suitable support or staff 7. Such a coil, however, is purely representative and that the particular construction and design of the coil including the number of turns and the diameter of the turns is not critical and a wide range of coil designs would be available to those skilled in the art. It will also be understood that the staff 7 simply forms a simple and convenient means of supporting the coil 6 so that it can be oriented at will in space and that any other suitable mounting may be employed. In order to indicate the inclination of the coil a suitable indicator 16 shown in diagrammatic form in Figures 4 and 15 is employed and this indicator may take, for instance, the form of a gravity needle or a liquid level indicator.

Figure 4:
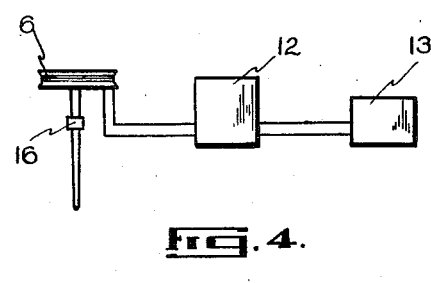
Figure 4 is a diagrammatic showing of a suitable apparatus for detecting magnetic field time transients.

In Figure 8 the equipment shown in Figures 4 and 5 utilized to measure not only the magnitude or maximum intensity of the transient magnetic field in the neighbourhood of conductor 6, but also ascertain the direction of such maximum intensity fields at the various stations. Figure 8 illustrates another conception of the mechanism of concentration and alignment of the transient magnetic fields.

In Figure 3 it is indicated that the magnetic fields cannot penetrate the conductor body 4. This can be considered as due either to a distortion of the magnetic field around the conductor body or as due to cancellation of fields in the vicinity of the body, the cancellation arising from the secondary magnetic fields created by eddy currents in the conductor which has been induced by the original field. The directions of fields from the eddy currents is such as to oppose or cancel the original field as recognized in the art.

In Figure 8 the transient fields 5 are shown as penetrating the conductor body 4 and producing eddy currents indicated at 17. These eddy currents, as explained, circulate around the edge of the body and in turn produce magnetic fields passing perpendicularly through the body in the opposite direction to the fields 5. The resultant field is therefore decreased near the centre of the body and increased near the edges and tends to be generally aligned in a direction perpendicular to the body.

Whichever conception is taken the result is the concentration of the transient fields 5 at the edges of the body and a polarization of such fields in the direction generally perpendicular to the body.

As an alternative way of detecting the transient magnetic fields Figure 9 illustrates the employment of the coil 6 to determine the angle of the field for minimum signal in the vicinity of the conductor body 4 at a plurality of stations.

The minimum signal is obtained by orienting the coil 6 in space so that it aligns with the direction of the polarized field due to the presence of the conductor at the particular point in space at which the coil is located.

Figure 10:
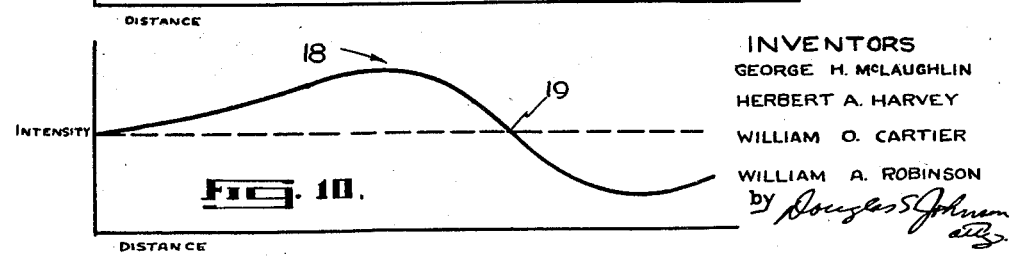
Figure 10 is a plot of the dip angle obtained from the measurements of Figure 9.

Figure 10 illustrates a plot of the dip angle of the coil with distance obtained as a result of taking the observations illustrated in Figure 9.

This curve 18 is again indicative of characteristics of the conductor body 4 and as well establishes the location of the conductor as at the point of inflection 19 where the curve 18 crosses the abscissa axis.

When observations are taken in the neighbourhood of a magnetic body or a body having magnetic properties quite a reverse effect is obtained enabling a body with magnetic properties to be distinguished from a body having conductor properties. As illustrated in Figure 11 while an analagous effect on concentration and polarization of the transient magnetic field takes place the field represented by the lines of force 5 is so distorted as to pass through the body 20 having the magnetic properties. Thus if the equipment of Figures 4 and 5 is utilized to measure the intensity of the transient field at station A' and at station B', a field of lower intensity will be detected at station A'. Thus, if the method illustrated in Figure 6 is carried out with respect to the magnetically permeable body a curve 21 as illustrated in Figure 12 having a reverse formation to the curve illustrated in Figure 7 will be obtained.

Similarly, if detection of the transient field is carried out in the vicinity of the body 20 according to the method illustrated in Figure 9 a curve 22 of the dip angle as illustrated in Figure 13, just the reverse of the curve 18 of Figure 10, will be obtained.

Another important distinction between the effect of conductor bodies on the transient magnetic fields and effects of bodies having magnetic properties is that for conductor bodies the effects increase with frequency while for magnetic bodies they decrease with frequency. Thus, when both magnetic and conducting materials occur together the magnetic effect will predominate at the low frequencies and the conducting effect at the high frequencies.

By providing equipment illustrated in Figure 5 which can be selectively resonated to respond to different frequency transient fields the variation of the effects on the transient fields due to the subterranean body can be quickly determined over a range of frequencies for distinguishing materials which are electrically conducting and materials which have magnetic properties.

The above illustrations are merely indicative of the manner in which measurements of the effects due to the mineral deposit on the magnetic transients may be carried out. In addition to detecting the fact of polarization of or the existence of a direction to the field in space the measurement of change in direction of the field, the measurement of the amplitude of the field, derivatives of either amplitude or direction of the field may also be measured. In addition the phase of the field may be measured. Again, the effects on the transient fields may be measured, for instance, by employing a pair of coils 6 and 6' as illustrated in Figure 14. These coils may be connected through suitable amplifiers 12 and 12' to a suitable indicator 13 for an indication of cancellation of the signals generated in the coils 6 and 6'. As the transient fields normally are essentially random in direction two coils 6 connected together as illustrated in Figure 14 would produce no cancellation effect at the indicator 13 as the field at coil 6 would be in a different direction to the field at 6'. However, upon polarization of the field due to the presence of a body of conducting or magnetic properties the signals generated in the coils 6 and 6' would be essentially identical and the cancellation at the indicator 13 observed. The use of the system of the two or double coils 6 and 6' is effective to minimize thermal noise produced in the receiving coils which thermal noise is the limiting factor on the sensitivity of the apparatus. The thermal noise is simply the transients produced by the current flowing through the coils 6 or 6' which could be large enough to mask out the signals generated in the coils by weak transient fields. By use of the coincidence of transients in the two coils 6 and 6' the desired signal can be detected and distinguished from the thermal noise. In addition if the two coils 6 and 6' connected in opposition are kept a given distance apart and are moved along together a space derivative curve of the transient field can be obtained. Again one of the coils 6 might be kept stationary and the other moved about. Still again the coil 6 and 6' could be maintained in a relative angular disposition and the difference in amplitude in two directions of the field measured. It will be appreciated that other specific manners of carrying out the detection and measurement of the measurable effects of the influencing subterranean bodies 4 and 20 may be employed as could be readily devised by those experienced in the art of geophysics.

Briefly in summary, it will be seen, therefore, that the method of prospecting according to the invention in each case involves the utilization, as an exploring energy source, of time transients of the earth's magnetic field having frequencies within the range of approximately 1 to 20,000 c.p.s. The method is carried out by measuring, as a first step, spacially distinct magnetic time transients of at least one frequency within the frequency range. It will be understood that such spacially distinct transients may be either transients measured at spaced points or at the same point but measured in different directions. In each case the transients measured have a difference in at least one of the identifying characteristics, namely, position or direction, and therefore are spacially distinct.

The second step of the method involves isolating from the measured time-varying transients any variations therein which are independent of time, that is, involves isolating any spacial variations in the transients. The existence and nature of such spacial variations form a means of determining the existence and location of an influencing geophysical body which may be either a conductor or a magnetic body.

The step of isolating such spacial variations in the time transients may be carried out in several different ways as described above, but in each case the carrying out of the step involves discarding the variations of the transients which occur with time and which, if not discarded, would render any variations appearing in the measurements of the spacially distinct transients meaningless.

The isolation may be effected, for instance, as will be obvious from Figures 3, 6 and 11, by orienting the coil at a given point to ascertain if a maximum or minimum signal can be detected. Should the position of the coil for a maximum or minimum indicate a tilt of the field from the normal direction of the field, which, as indicated in the figures, is horizontal at points remote from the influencing geophysical body, then the step of orienting the coil will have isolated such polarization. This polarization is a spacial variation in the magnetic transients which is quite independent of time. That is, because such polarization always exists, it does not matter at what moment of the day, month or year the isolating step is carried out.

Again as explained above, the coil 6 may be oriented at each station in the same direction as at the previous station, e.g. may be oriented to ignore any vertical component of the magnetic time transients, as shown in Figure 6, to effect isolation of the spacial variations in the transients—e.g. the presence of spacial changes of the horizontal components of the transients, which spacial variations are quite independent of time.

As another example, as discussed above, two coils 6 and 6' may be used so that the time transients measured at a reference station, and which vary with time in the same manner as the time transients measured at a different station, either stationary or moving, may be contrasted with or cancelled against the transients measured at the different station with any resultant signal being constituted by a variation in the time transients, due only to space and not time.

Thus, through the setting up and the making of simultaneous measurements of the transients at a reference station, the spacial variations are isolated.

While for simplicity of illustrations measurements of the transient magnetic fields are indicated as carried out at several stations, it will be appreciated that the measurements can be carried out in precisely the same way and with equal facility while moving the coil 6 continuously over an area to be investigated. For instance, by mounting the coil 6 in a vehicle or in an aircraft the polarization or direction of the transient magnetic field throughout a space can be detected by noting the change in amplitude of the signal output from the coil as it is moved. The signal output as amplified by the amplifier 12 may be continuously recorded by any of the suitable known recorders, for instance those employed in present electro-magnetic prospecting.

It will also be understood the receiving apparatus or equipment can be readily elaborated on by those skilled in the art, and the equipment illustrated is simply to indicate one simplified form of the equipment with which the invention may be carried out and it is not intended as any limitation on the equipment which may be employed. Although the fields are detected by the voltages induced in induction coils, this form of field detector is simply employed as the simplest illustration of the method. Fluxgate magnetic field detectors or other devices for measuring magnitudes of magnetic fields could be utilized by those skilled in the field of geophysics.

What we claim as our invention is:

1. A method of geophysical prospecting comprising measuring time transients of the earth's magnetic field of at least one frequency within the frequency range of 1 to 20,000 c.p.s. at a plurality of points throughout an area to be investigated, comparing time transients measured at different points throughout the area to detect the existence of any anomaly therein which is independent of time, caused by a subterranean body within said area capable of measurably effecting such transients to locate said body.

2. A method as claimed in claim 1 in which measurement of said time transients is carried out to ascertain anomalous concentrations thereof.

3. A method as claimed in claim 1 in which measurement of said transients is carried out to ascertain alignment thereof.

4. A method as claimed in claim 1 in which such transients are measured in at least two directions in space throughout the area.

5. A method of geophysical prospecting comprising detecting time transients of a selected frequency of the earth's magnetic field selected within the frequency range of 1 to 20,000 c.p.s. at a plurality of points within an area to be investigated and detecting any variation in the time transients so detected which is independent of time due to the presence of an influencing geophysical structure within said area in order to ascertain the existence of such structure.

6. A method as claimed in claim 5 in which said transients are continuously measured while moving over the area to be investigated.

7. A method as claimed in claim 5 in which transients of at least two different frequencies are detected.

8. A method as claimed in claim 5 in which detection of transients of at least two different frequencies is carried out at a plurality of points throughout the area.

9. A method of geophysical prospecting comprising measuring polarization of time transients of the earth's magnetic field of at least one frequency within the frequency range of 1 to 20,000 c.p.s. due to the presence of an ore body to ascertain the existence of said ore body.

10. A method of geophysical prospecting comprising detecting time transients of a selected frequency of the earth's magnetic field selected within the frequency range of 1 to 20,000 c.p.s. by a pair of identical tuned circuits tuned to resonate at such selected frequency, and cancelling out any signals of opposite polarity generated in said circuits due to polarization of said time transients under the effect of an influencing ore body, the degree of cancellation indicating the degree of polarization and hence the degree of influence of an ore body.

11. A method of geophysical prospecting comprising measuring the direction of time transients of at least one selected frequency of the earth's magnetic field selected within the frequency range of 1 to 20,000 c.p.s. at a plurality of locations within an area to be investigated to ascertain a change in direction of such time transients, such change in direction indicating the presence of a subterranean electrically conducting or magnetically permeable body.

12. A method of geophysical prospecting comprising utilizing as an exploring energy source time transients of the earth's magnetic field having frequencies within the range of approximately 1 to 20,000 c.p.s. and exploring an area to be investigated by measuring within the area spacial variations which are independent of time in the intensity of magnetic time transients of at least one frequency within said frequency range caused by the presence of an influencing geophysical body while ignoring variations in intensity which occur with time to ascertain the presence of such geophysical body.

13. A method of geophysical prospecting comprising utilizing as an exploring energy source time transients of the earth's magnetic field having frequencies within the range of approximately 1 to 20,000 c.p.s. and exploring an area to be investigated by measuring at a plurality of points within the area spacially distinct magnetic time transients of at least one frequency within said frequency range, and isolating from the measured time transients spacial variations therein which are independent of time as a means of determining the presence of a geophysical body.

14. A method of geophysical prospecting comprising utilizing as an exploring energy source time transients of the earth's magnetic field having frequencies within the range of approximately 1 to 20,000 c.p.s. and exploring an area to be investigated by measuring the intensity of magnetic time transients of at least one frequency within said frequency range at points within said area, isolating from said measured transients any anomaly in intensity which is independent of time, and comparing any such isolated intensity anomalies as a means of locating an influencing geophysical body.

15. A method as claimed in claim 14 in which said magnetic transients are measured in the same direction at each of said points within the area and said measurements are compared for anomalous concentrations thereof which are independent of time.

16. A method as claimed in claim 14 in which said magnetic transients are measured at each of said points for any polarization thereof.

17. A method as claimed in claim 14 in which said magnetic transients are measured in various directions at each of said points within the area, and the direction of any anomalous concentrations at said points are compared to locate such influencing geophysical body.

18. A method of geophysical prospecting comprising utilizing as an exploring energy source time transients of the earth's magnetic field having frequencies within the range of approximately 1 to 20,000 c.p.s. and exploring an area to be investigated by measuring the intensity of magnetic time transients of at least one frequency within said frequency range at points within said area to determine any polarization in such transients at said points, and comparing the direction of any such polarized fields at such points as a means of locating an influencing geophysical body.

19. A method of geophysical prospecting comprising utilizing as an exploring energy source time transients of the earth's magnetic field having frequencies within the range of approximately 1 to 20,000 c.p.s. and exploring an area to be investigated by simultaneously electrically measuring the intensity of spacially distinct magnetic time transients of at least one frequency within said frequency range, and electrically comparing said simultaneous measurements to determine any non-random variations in said spacially distinct transients which are independent of time, the existence of any non-random variations in said time transients indicating the presence of an influencing geophysical body.

20. A method as claimed in claim 19 in which the spacially distinct magnetic time transients which are electrically measured are transients measured in different directions.

21. A method as claimed in claim 19 in which the spacially distinct magnetic time transients which are electrically measured are transients at physically spaced points.

22. A method as claimed in claim 21 in which the transients measured are measured in the same direction.

23. A method as claimed in claim 21 in which the transients are measured at various points throughout the area and compared with transients at a fixed point within the area.

24. A method of geophysical prospecting comprising utilizing as an exploring energy source time transients of the earth's magnetic field having frequencies within the range of approximately 1 to 20,000 c.p.s. and exploring an area to be investigated by simultaneously electrically measuring the intensity of spacially distinct magnetic time transients of at least one frequency within said frequency range, and electrically cancelling such measurements one against the other to detect any differences therein resulting from spacial differences and independent of time, caused by an influencing geophysical body, as a means of determining the presence of such body.

25. A method of geophysical prospecting comprising measuring the earth's magnetic time transients of at least one frequency within the range of 1 to 20,000 c.p.s. within a region to be explored to detect the existence of any anomaly therein, which is independent of time, imparted thereto by the presence of electrically conducting or magnetically permeable bodies located within said region.

26. A method of geophysical prospecting comprising detecting time transients of a selected frequency of the earth's magnetic field selected within the frequency range of 1 to 20,000 c.p.s. by a pair of identical frequency selective networks tuned to resonate at such selected frequency connected in opposition and cancelling out any signals of opposite polarity generated in said circuits due to polarization of said time transients under the effect of an influencing ore body, the degree of cancellation indicating the degree of polarization and hence the degree of influence of an ore body.

27. A method of geophysical prospecting comprising measuring the earth's magnetic time transients of at least one frequency within the range of 1 to 20,000 c.p.s. within a region to be explored to detect the existence of any anomaly therein, which is independent of time, imparted thereto by the presence of electrically conducting or magnetically permeable bodies located within said region, while ignoring effects of permanent magnetization of such body, and analyzing the anomaly detected as a source of information relating to such body.

28. A method of geophysical prospecting comprising measuring in the same spacial direction at a plurality of locations within an area to be investigated the intensities of time transients of the earth's magnetic field having a rate of change within the range 1 to 20,000 per second to ascertain any time independent anomalous change, in moving from location to location, in the average level of intensity of such time transients imparted thereto by the presence of electrically conducting or magnetically permeable bodies located within said area.

29. A method of geophysical prospecting comprising utilizing as an exploring energy source time transients of the earth's magnetic field having frequencies within the range of approximately 1 to 20,000 c.p.s. and exploring an area to be investigated by simultaneously electrically measuring the intensity of spacially distinct magnetic time transients of at least one frequency within said frequency range measured at a selected point within said area and a fixed point at least generally in the vicinity of said area, repeating such measurements at different selected points within said area, and electrically comparing said simultaneous measurements to determine any non-random variations in said spacially distinct transients which are independent of time, the existence of any non-random variations in said time transients indicating the presence of an influencing geophysical body located within said area.

References Cited in the file of this patent

UNITED STATES PATENTS

| | | |
|---|---|---|
| 1,708,386 | Gella | Apr. 9, 1929 |
| 1,803,405 | Ricker | May 5, 1931 |
| 1,859,005 | Ricker | May 17, 1932 |
| 1,934,079 | Lundberg et al. | Nov. 7, 1933 |
| 2,105,247 | Jakosky | Jan. 11, 1938 |
| 2,108,463 | Zuschlag | Feb. 15, 1938 |
| 2,559,586 | Bjarnason | July 10, 1951 |
| 2,664,542 | Lynn | Dec. 29, 1953 |

OTHER REFERENCES

"Exploration Geophysics," by Jackosky, 1950, second edit., by Trija Publishing Co., Gayley Ave., Los Angeles 24, Calif., pages 106–108.